(12) United States Patent
Al-Shamma et al.

(10) Patent No.: US 7,477,093 B2
(45) Date of Patent: Jan. 13, 2009

(54) MULTIPLE POLARITY REVERSIBLE CHARGE PUMP CIRCUIT

(75) Inventors: Ali K. Al-Shamma, Mountain View, CA (US); Roy E. Scheuerlein, Cupertino, CA (US)

(73) Assignee: SanDisk 3D LLC, Milpitas, CA (US)

( * ) Notice: Subject to any disclaimer, the term of this patent is extended or adjusted under 35 U.S.C. 154(b) by 0 days.

(21) Appl. No.: 11/618,841

(22) Filed: Dec. 31, 2006

(65) Prior Publication Data
US 2008/0157854 A1    Jul. 3, 2008

(51) Int. Cl.
  *G05F 1/10* (2006.01)
(52) U.S. Cl. ....................................... 327/536
(58) Field of Classification Search ................ 327/535, 327/536, 537
See application file for complete search history.

(56) References Cited

U.S. PATENT DOCUMENTS

| | | | |
|---|---|---|---|
| 4,636,930 | A | 1/1987 | Bingham et al. |
| 4,935,644 | A | 6/1990 | Tsujimoto |
| 5,036,229 | A | 7/1991 | Tran |
| 5,422,586 | A | 6/1995 | Tedrow et al. |
| 5,432,469 | A | 7/1995 | Tedrow et al. |
| 5,508,971 | A | 4/1996 | Cernea et al. |
| 5,596,532 | A | 1/1997 | Cernea et al. |
| 5,699,387 | A | 12/1997 | Seto et al. |
| 5,748,032 | A | 5/1998 | Baek |
| 5,767,735 | A | 6/1998 | Javanifard et al. |
| 5,812,018 | A * | 9/1998 | Sudo et al. .................. 327/537 |
| 5,818,289 | A | 10/1998 | Chevallier et al. |
| 5,898,328 | A | 4/1999 | Shoji |
| 5,942,949 | A | 8/1999 | Wilson et al. |
| 5,973,546 | A | 10/1999 | Le et al. |
| 5,978,283 | A | 11/1999 | Hsu et al. |
| 6,023,188 | A * | 2/2000 | Lee et al. ..................... 327/536 |
| 6,034,882 | A | 3/2000 | Johnson et al. |
| 6,130,574 | A | 10/2000 | Bloch et al. |
| 6,147,547 | A * | 11/2000 | Ogura et al. ................. 327/536 |
| 6,157,242 | A | 12/2000 | Fukui |
| 6,184,741 | B1 | 2/2001 | Ghilardelli et al. |
| 6,272,670 | B1 | 8/2001 | Van Myers et al. |
| 6,385,074 | B1 | 5/2002 | Johnson et al. |
| 6,418,040 | B1 | 7/2002 | Meng |

(Continued)

OTHER PUBLICATIONS

U.S. Appl. No. 11/618,838 filed Dec. 31, 2006 entitled "Method for Using a Multiple Polarity Reversible Charge Pump Circuit," by Ali K. Al-Shamma and Roy E. Scheuerlein.

(Continued)

*Primary Examiner*—Jeffrey S Zweizig
(74) *Attorney, Agent, or Firm*—Zagorin O'Brien Graham LLP

(57) ABSTRACT

A multiple polarity reversible charge pump circuit is disclosed which, in certain embodiments, may be configured to generate a positive voltage at times and may be reversed to generate a negative voltage at other times. Such a charge pump circuit is advantageous if both the positive and negative voltage are not simultaneously required. In certain other embodiments, a charge pump circuit generates a high output current for only a positive boosted voltage in one mode of operation, but lower current positive and negative boosted voltage outputs in another mode of operation. Use with certain erasable memory array technologies is disclosed, particularly certain resistive passive element memory cells, and more particularly in a three-dimensional memory array.

33 Claims, 9 Drawing Sheets

U.S. PATENT DOCUMENTS

| | | | |
|---|---|---|---|
| 6,420,215 | B1 | 7/2002 | Knall et al. |
| 6,429,724 | B1 * | 8/2002 | Ogura et al. ............... 327/536 |
| 6,452,438 | B1 | 9/2002 | Li |
| 6,483,728 | B1 | 11/2002 | Johnson et al. |
| 6,486,728 | B2 | 11/2002 | Kleveland |
| 6,501,325 | B1 | 12/2002 | Meng |
| 6,525,949 | B1 | 2/2003 | Johnson et al. |
| 6,525,953 | B1 | 2/2003 | Johnson |
| 6,545,529 | B2 | 4/2003 | Kim |
| 6,545,898 | B1 | 4/2003 | Scheuerlein |
| 6,888,400 | B2 * | 5/2005 | Lin et al. ............... 327/536 |
| 6,891,748 | B2 | 5/2005 | Tsuchida et al. |
| 6,914,791 | B1 | 7/2005 | Park et al. |
| 6,922,097 | B2 | 7/2005 | Chan et al. |
| 6,952,030 | B2 | 10/2005 | Herner et al. |
| 6,952,043 | B2 | 10/2005 | Vyvoda et al. |
| 7,023,260 | B2 | 4/2006 | Thorp et al. |
| 2001/0010477 | A1 | 8/2001 | Myono |
| 2001/0013804 | A1 | 8/2001 | Lin et al. |
| 2002/0130703 | A1 | 9/2002 | Tsai |
| 2005/0158950 | A1 | 7/2005 | Scheuerlein et al. |
| 2006/0250836 | A1 | 11/2006 | Herner et al. |
| 2006/0250837 | A1 | 11/2006 | Herner et al. |
| 2007/0072360 | A1 | 3/2007 | Kumar et al. |
| 2007/0090425 | A1 | 4/2007 | Kumar et al. |
| 2007/0236981 | A1 | 10/2007 | Herner |
| 2008/0025131 | A1 | 1/2008 | Scheuerlein et al. |
| 2008/0025133 | A1 | 1/2008 | Scheuerlein et al. |

OTHER PUBLICATIONS

Baek et al., "Highly Scalable Non-volatile Resistive Memory using Simple Binary Oxide Driven by Asymmetric Unipolar Voltage Pulses," IEEE International Electron Devices Meeting, 2004.

Hwang et al., "Writing Current Reduction for High-Density Phase-Change RAM," IEEE International Electron Devices Meeting, 2003.

Pirovano et al., "Electronic Switching in Phase-Change Memories," IEEE Transactions on Electronic Devices, vol. 51, No. 3, Mar. 2003.

Baek et al., "Multi-layer Cross-point Binary Oxide Resistive Memory (OxRRAM) for Post-NAND Storage Application," IEEE International Electron Devices Meeting, 2005.

Dickson, J. F., "On-Chip High-Voltage Generation in MNOS Integrated Circuits Using an Improved Voltage Multiplier Technique," IEEE Journal of Solid-State Circuits, vol. SC-11, No. 3, pp. 374-378 (1976).

Kawahara, T., et al., "Internal Voltage Generator for Low Voltage, Quarter-Micrometer Flash Memories," IEEE Journal of Solid-State Circuits, vol. 33, No. 1, pp. 126-132 (1998).

Wang, Chi-Chang and Wu, Jiin-chuan, "Efficiency Improvement in Charge Pump Circuits," IEEE Journal of Solid-State Circuits, vol. 32, No. 6, pp. 852-860 (1997).

Kawahara, T. et al., "Bit-Line Clamped Sensing Multiplex and Accurate High Voltage Generator for Quarter-Micron Flash Memories," IEEE Journal of Solid-State Circuits, vol. 31, No. 11, pp. 1590-1600 (1996).

Tanzawa, Toru and Tanaka, Tomoharu, "A Dynamic Analysis of the Dickson Charge Pump Circuit," IEEE Journal of Solid-State Circuits, vol. 32, No. 8, pp. 1231-1240 (1997).

Gariboldi, Roberto and Pulvirenti, Francesco, "A 70 m$\Omega$ Intelligent High Side Switch with Full Diagnostics," IEEE Journal of Solid-State Circuits, vol. 31, No. 7 pp. 915-923 (1996).

Jieh-Tsorng Wu & Kuen-Long Chang, "MOS Charge Pumps for Low-Voltage Operation," IEEE Journal of Solid-State Circuits, vol. 33, No. 4, Apr. 1998, pp. 592-597.

International Search Report and Written Opinion mailed May 7, 2008 in PCT App. No. PCT/US2007/088159, 11 pages.

* cited by examiner

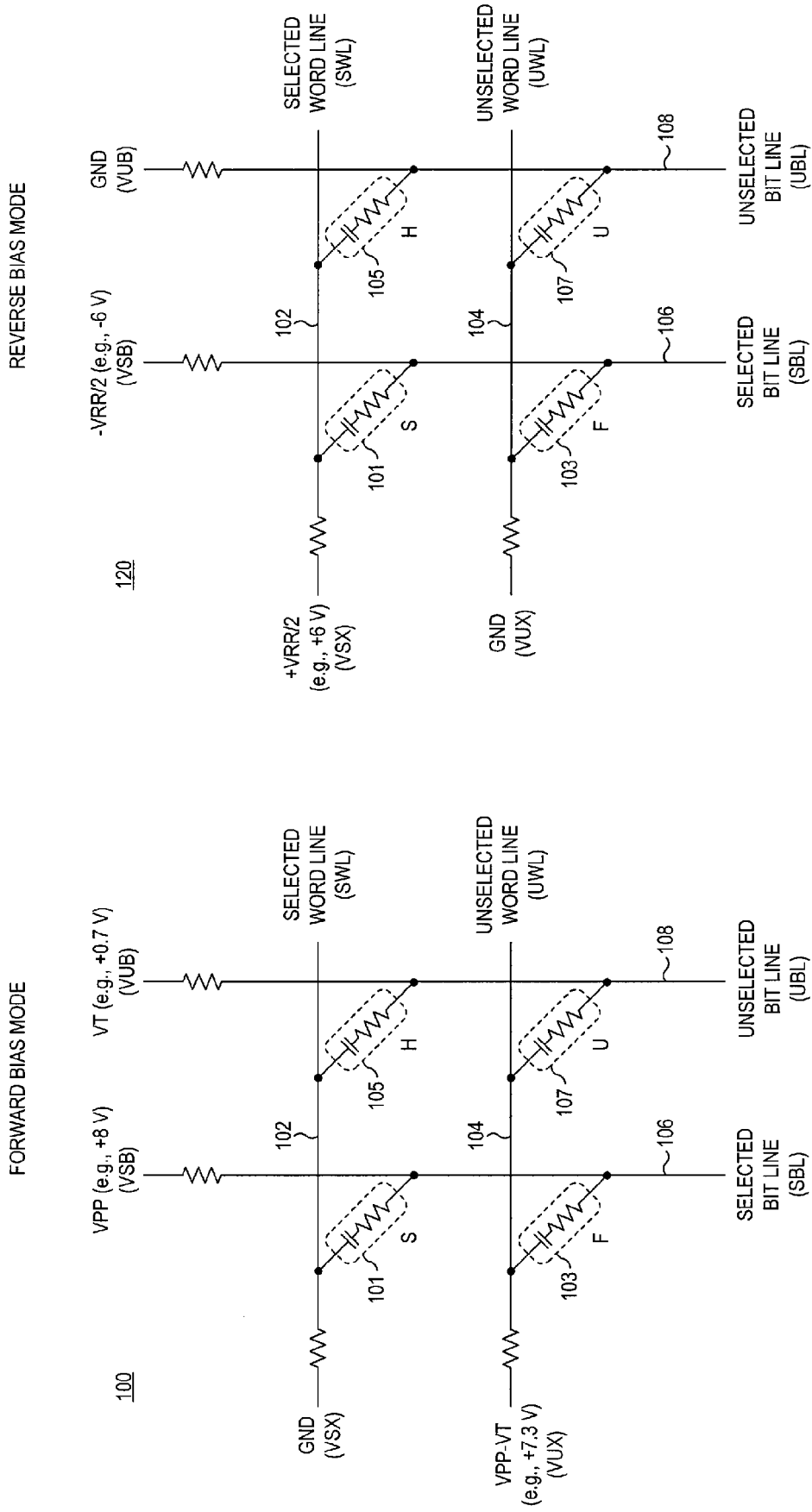

MULTIPLE POLARITY REVERSIBLE CHARGE PUMP CIRCUIT

CROSS-REFERENCE TO RELATED APPLICATION(S)

This application is related to the following co-pending U.S. Application(s), each of which is incorporated by reference herein in its entirety:

U.S. Application No. 11/618,838 entitled "Method for Using a Multiple Polarity Reversible Charge Pump Circuit" by Ali K. Al-Shamma and Roy E. Scheuerlein, filed on even date herewith.

BACKGROUND

1. Field of the Invention

The present invention relates to semiconductor voltage generator circuits, and particularly to capacitive voltage multiplier circuits.

2. Description of the Related Art

Many integrated circuits, particularly those using a single power supply voltage, incorporate on-chip circuitry to generate a "boosted" voltage having a magnitude greater than the power supply voltage. Frequently this boosted voltage is used as a veritable power supply voltage for portions of the circuitry contained on the integrated circuit. For example, certain types of semiconductor memories, such as "flash" EEPROM memories, write a memory cell by accelerating electrons across a tunneling dielectric and storing the charge on a floating gate above a field effect transistor. On contemporary devices, this acceleration of charge across the tunneling dielectric frequently requires a "write voltage" on the order of 8 volts, yet the remainder of the operations of the memory circuitry typically requires a voltage on the order of only 3 volts, including reading the memory cells. Unlike many older devices which require two different power supply voltages be supplied to operate the device (e.g., +5 and +12 volts), many contemporary devices require only a single power supply voltage (usually called VDD) equal to 2.5-3.3 volts (relative to "ground" or VSS). This VDD power supply voltage is typically utilized to power most of the device, including the normal read operation circuits. The write voltage (frequently, although not always, called VPP for legacy reasons) is generated by an on-chip voltage generator having a typical value of +8 volts (again relative to VSS) rather than requiring a separate power supply voltage be supplied by a user of the device.

In many integrated circuits, such on-chip voltage generators are implemented as capacitive voltage multiplier circuits, largely because of the historical ease of implementing suitably large capacitors on a monolithic integrated circuit, especially compared to implementing good quality inductors. These capacitive voltage multiplier circuits are usually called "charge pumps" by those in the art. Not to be confused with capacitive voltage multiplier circuits, there is another class of circuits also frequently called charge pumps. These are frequently used to integrate small current pulses generated each cycle by a phase detector circuit, and to consequently generate an analog voltage on a capacitor node which represents the phase error between two phase detector input signals. During each cycle, a typical phase detector "pumps" a first current pulse into the capacitor node and "pumps" a second current pulse from the capacitor node. If the phase error is zero, these two current pulses are equal, and the voltage on the capacitor node is unchanged. But if the phase of one input signal lags the other, one of the current pulses is greater in magnitude, or longer in duration, or both, so that the net charge into the capacitor node is non-zero, and a voltage change results. Such "phase detector integrator" charge pumps are quite different in both function and structure, and are consequently not considered to be related to capacitive voltage multiplier circuits. Consequently, as used herein, a "charge pump" refers to a capacitive voltage multiplier circuit and not to such phase detector integrator circuits, unless the context so requires.

In the nonvolatile memory example described above, the write voltage generated by the charge pump is typically higher than the VDD power supply voltage provided to the device. In other integrated circuits, a charge pump may be used to generate a voltage below the reference voltage VSS (i.e., "below ground"). For example, a negative bias voltage is generated in many memory devices such as dynamic random access memories (DRAMs), static random access memories (SRAMs), and other circuits, to bias a substrate and/or a CMOS well within the substrate.

A traditional (and very well known) charge pump circuit for generating a boosted voltage above VDD is taught by John F. Dickson in "On-Chip High-Voltage Generation in NMOS Integrated Circuits Using an Improved Voltage Multiplier Technique," IEEE Journal of Solid State Circuits, Vol. SC-11, No. 3, June 1976, pp. 374-378. Such a charge pump includes a plurality of serially-connected charge pump stages. Each charge pump stage includes a charge transfer device, such as a diode, and a pump capacitor, and has an input node and an output node. Complementary clock signals for use with such circuits are usually driven with fall VDD-level swings (i.e., transitioning between a low level of VSS and a high level of VDD).

Moreover, such voltage generator circuits also may consume a significant amount of power relative to the remainder of the circuit, and thus increase the current that must be supplied by the user (e.g., by the VDD power supply). In addition, such voltage generator circuits also may also require a significant amount of semiconductor real estate for their implementation, particularly if a high output current or large magnitude voltage is required.

SUMMARY

In an integrated circuit design that requires both positive and negative boosted voltages, two separate charge pump circuits would normally be provided. One such circuit would generate the positive voltage, and the other would generate the negative voltage. Such charge pump circuits rely on capacitive switching and charge sharing to generate these boosted voltages, and the amount of output current which can be generated is directly proportional to the physical size of the charge pump's capacitors. If the output current requirements for each voltage were both significant, each of these two charge pump circuits would require large pumping capacitors, and thus would consume considerable precious silicon area.

In certain cases, both the positive and negative voltage may not be required at the same time. For example, a high current positive voltage may be required in one mode of operation that does not require a negative voltage, and a high current negative voltage may be required in another mode of operation that does not require a positive voltage. In another example, a high output current may be required for only a positive boosted voltage in one mode of operation, but lower current positive and negative boosted voltage outputs are required in another mode of operation.

The present invention generally relates to an improved charge pump circuit which, in certain embodiments, may be configured to generate a positive voltage at times and may be reversed to generate a negative voltage at other times.

In one aspect, the invention provides a circuit which, in certain embodiments, includes a multi-stage charge pump circuit comprising a plurality of series-connected directional pump stages, each respective stage configured to transfer charge from a respective input thereof to a respective output thereof. The multi-stage charge pump circuit is selectable to develop a positive voltage on an output node of the charge pump circuit for a first mode of operation, and selectable to develop a negative voltage on another output node of the charge pump circuit for a second mode of operation.

In another aspect, the invention provides a circuit which, in certain embodiments, includes first and second voltage nodes, first and second output nodes, and a first multi-stage charge pump circuit comprising a plurality of series-connected directional pump stages, each respective stage configured to transfer charge from a respective input thereof to a respective output thereof. The circuit also includes a first switch circuit coupling one end of said first multi-stage charge pump circuit at times to the first voltage node and at other times to the first output node, and a second switch circuit coupling the other end of said multi-stage charge pump circuit at times to the second voltage node and at other times to the second output node.

In another aspect, the invention provides a circuit which includes, in certain embodiments, a first multi-stage charge pump circuit comprising a plurality of series-connected directional pump stages, said first multi-stage charge pump circuit independently operable to generate a first output voltage. The circuit also includes a second multi-stage charge pump circuit comprising a plurality of series-connected directional pump stages, said second multi-stage charge pump circuit independently operable to generate a second output voltage. The circuit also includes means for coupling, at times, the first multi-stage charge pump circuit to the second multi-stage charge pump circuit, to cooperatively generate a single output voltage having a greater voltage or current than either can generate operating independently.

While the present invention is useful in numerous circuits incorporating any of a wide variety of devices and structures, the invention is particularly beneficial when used with certain erasable memory array technologies, such as those incorporating certain resistive passive element memory cells. Such cells tend to have high leakage current when programming and erasing, and a memory array, particularly a three-dimensional memory array, therefore requires large currents at the required programming and erasing voltages. For example, in a program operation, the positive voltage charge pump may need to deliver a particularly high value of output current, while in an erase operation the negative voltage charge pump may need to deliver a particularly high value of output current (e.g., greater than any current needed at a boosted positive voltage).

Such large output currents require large charge pumps. However, it is undesirable to build two very large charge pumps if one of them (e.g., a negative voltage charge pump) is only utilized for certain mode(s) of operation. A multiple polarity reversible charge pump circuit, as described herein, allows a much smaller, lower power charge pump circuit to generate the required voltages at the required output currents.

The invention in several aspects is particularly suitable for implementation within an integrated circuit, including those integrated circuits having a memory array, for methods for operating such circuits, for systems incorporating such circuits, and for computer readable media encodings of such circuits, all as described herein in greater detail and as set forth in the appended claims. A wide variety of such integrated circuits is specifically contemplated, including those having a three-dimensional memory array formed above a substrate.

The foregoing is a summary and thus contains, by necessity, simplifications, generalizations and omissions of detail. Consequently, those skilled in the art will appreciate that the foregoing summary is illustrative only and that it is not intended to be in any way limiting of the invention. Other aspects, inventive features, and advantages of the present invention, as defined solely by the claims, may be apparent from the detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 10 is a schematic diagram of an exemplary memory array, illustrating selected and unselected word lines and bit lines, and exemplary bias conditions in a forward bias mode of operation.

FIG. 11 is a schematic diagram of the exemplary memory array depicted in FIG. 10, but illustrating exemplary bias conditions in a reverse bias mode of operation.

DESCRIPTION OF THE PREFERRED EMBODIMENT(S)

The use of the same reference symbols in different drawings indicates similar or identical items.

Figure 1:
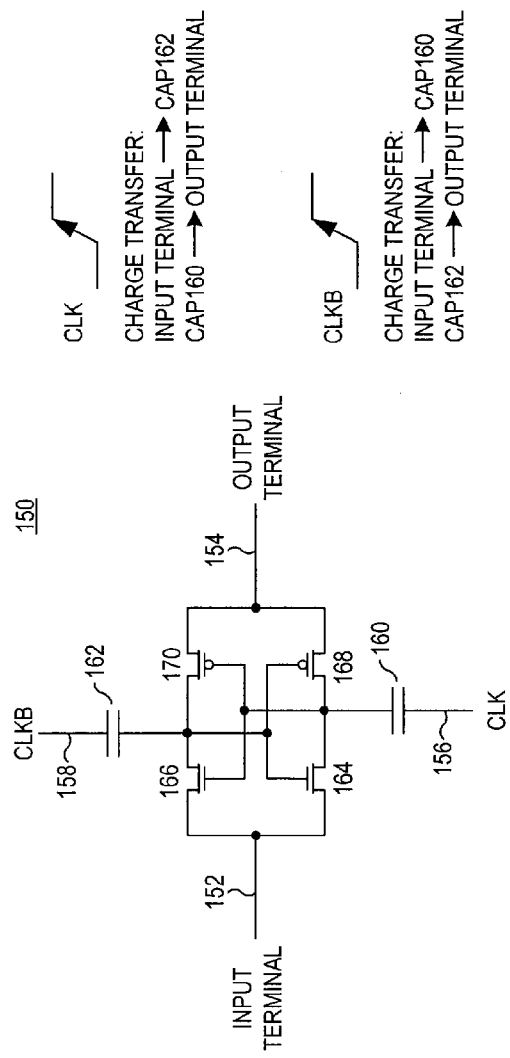
FIG. 1, labeled prior art, depicts a directional charge pump stage utilizing a pair of cross-coupled charge transfer switch devices.

Referring now to FIG. 1, an exemplary directional charge pump stage 150 is depicted. Such a charge pump stage 150 is frequently incorporated as one of a plurality of series-coupled charge pump stages within a charge pump circuit.

The charge pump stage 150 is clocked by two complementary clocks CLK (also labeled 156) and CLKB (also labeled 158), and charge is always transferred from the input terminal 152 to the output terminal 154 (i.e., here shown as left to right). On a rising edge of the CLK signal, and during the time that CLK remains high, charge transfers from the input terminal 152 (i.e., "input node"), through NMOS transistor 166, to capacitor 162. During the same rising edge of the CLK signal, charge also transfers from capacitor 160, through PMOS transistor 168, to the output terminal 154.

On a rising edge of the CLKB signal, and during the time that CLKB remains high, charge transfers from the input terminal 152, through NMOS transistor 164, to capacitor 160. During the same rising edge of the CLKB signal, charge also transfers from capacitor 162, through PMOS transistor 170, to the output terminal 154.

Operation of such directional charge pump stages are well known, and many variants are known. Exemplary charge pump circuits are described in U.S. Pat. No. 7,023,260 granted Apr. 4, 2006 to Thorp, the disclosure of which is hereby incorporated by reference in its entirety.

Figure 2:
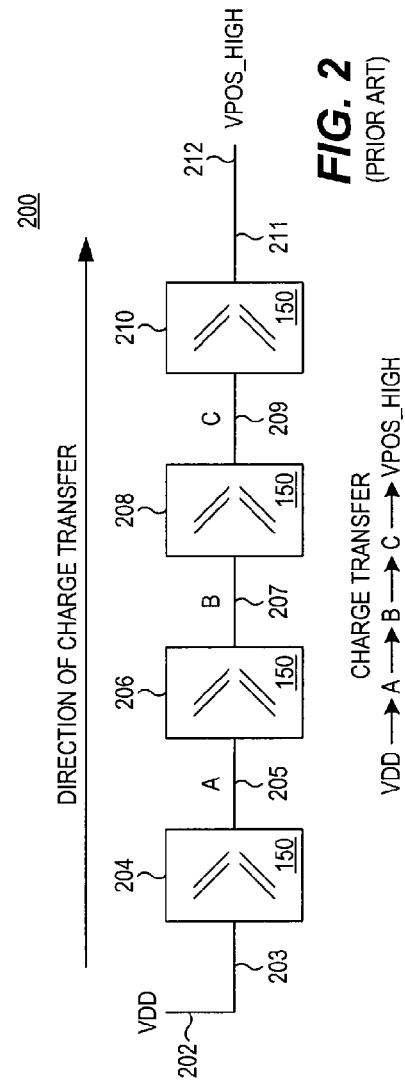
FIG. 2 depicts a block diagram of a charge pump circuit configured to generate a boosted positive voltage.

Referring now to FIG. 2, a exemplary charge pump circuit 200 is depicted which includes a first string of series-connected charge pump stages 204, 206, 208, 210 (each of which may be implemented like the charge pump stage 150, or other suitable directional charge pump stages) and is configured to generate a positive boosted output voltage VPOS_HIGH on node 212. Within the charge pump circuit, the output terminal of a given charge pump stage is coupled to the input terminal of the adjacent charge pump stage (of course, other than the last such charge pump stage). As shown on the left side of the figure, one end of the series-connected plurality of charge pump stages is coupled to a voltage node 202 conveying a positive voltage VDD. In other words, the input terminal 203 of charge pump stage 204 is coupled to a VDD power supply node 202. Such a voltage node 202 may be a power node (e.g., a positive "power supply" node), but might alternatively convey an internally generated voltage (e.g., the output of another charge pump circuit, as will be described below. As shown on the right side of the figure, the other end of the plurality of series-connected charge pump stages is coupled to an output node 212 which conveys the positive voltage VPOS_HIGH. In other words, the output terminal 211 of charge pump stage 210 is coupled to an output node 212 of the charge pump circuit 200. It should be noted that, as used herein, the designations of "input" node and "output" node of each charge pump stage refer to the direction of charge transfer through the charge pump stage, and do not necessarily imply specific connections or voltages. Such will be made more clear by the descriptions of the embodiments shown below.

In operation, each stage is frequently driven by complementary clocks that are out of phase with those associated with its adjacent charge pump stages, as is well known. For example, charge pump stages 204 and 208 may be driven with CLK and CLKB, whereas charge pump stages 206 and 210 may be driven with CLKB and CLK. Moreover, the voltage generated on each intermediate node between charge pump stages increases with each stage. In other words, the voltage of node 205 is higher than VDD, the voltage of node 207 is higher than the voltage of node 205, and so forth, and the voltage of node output node 211 is higher than the other intermediate nodes, as is also known in the art.

Figure 3:
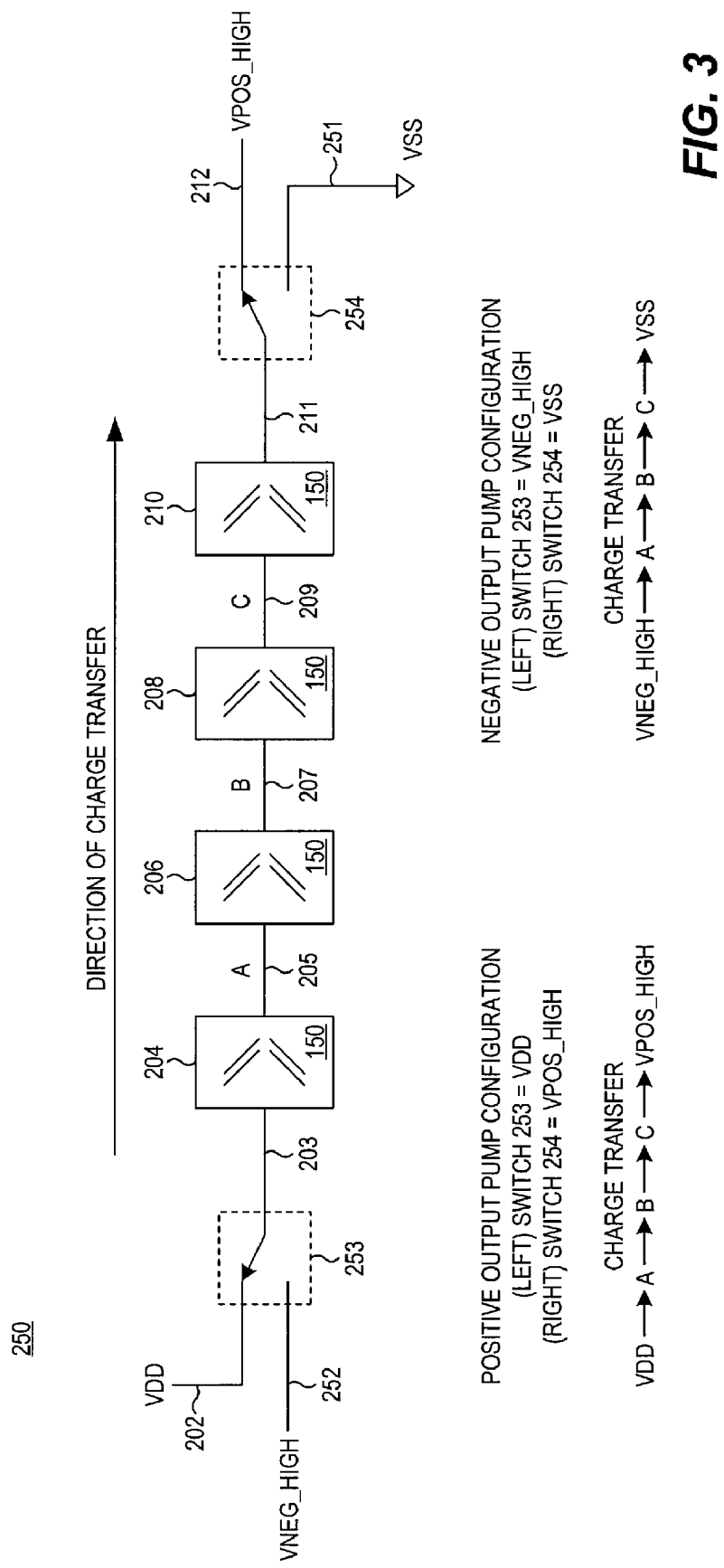
FIG. 3 depicts a block diagram of a charge pump circuit, in accordance with the present invention, which may be configured to generate a boosted positive voltage or a boosted negative voltage.

Referring now to FIG. 3, an exemplary charge pump circuit 250 is depicted in accordance with the present invention. This charge pump circuit 250 is a reversible charge pump circuit, and utilizes the fact that charge is always transferred from the left to the right (as drawn), or stated in other words, from the input to the output of each charge pump stage. The charge pump circuit 250 includes two switch circuits 253, 254 to configure the charge pump as a positive or negative charge pump. At the left end of the string of charge pump stages, a first switch circuit 253 couples the input terminal 203 of charge pump stage 204 to either the voltage node 202 (here shown as a VDD power supply node) or to a second output node 252 for conveying a negative boosted voltage VNEG_HIGH. At the right end of the string of charge pump stages, a second switch circuit 254 couples the output terminal 211 of charge pump stage 210 to either a second voltage node 251 (here shown as a GROUND power node) or to the first output node 212, as before, for conveying the positive boosted voltage VPOS_HIGH.

To generate a positive output voltage VPOS_HIGH on output node 212, the first switch circuit 253 is configured to couple the input terminal 203 of charge pump stage 204 to the voltage node 202 (i.e., VDD), and the second switch circuit 254 is configured to couple the output terminal 211 of charge pump stage 210 to the first output node 212, which configuration results in the equivalent connections as shown in FIG. 2. Charge is transferred from VDD to node A (node 205), then to node B (node 207), then to node C (node 209), then to the output node VPOS_HIGH.

To generate a negative output voltage VNEG_HIGH on output node 252, the first switch circuit 253 is configured to couple the input terminal 203 of charge pump stage 204 to the charge pump circuit output node 252, and the second switch circuit 254 is configured to couple the output terminal 211 of charge pump stage 210 to the second voltage node 251 (i.e., ground). Charge is transferred from the negative output node VNEG_HIGH to node A, then to node B, then to node C, then to ground (sometimes referred to as GND or VSS).

Figure 4:
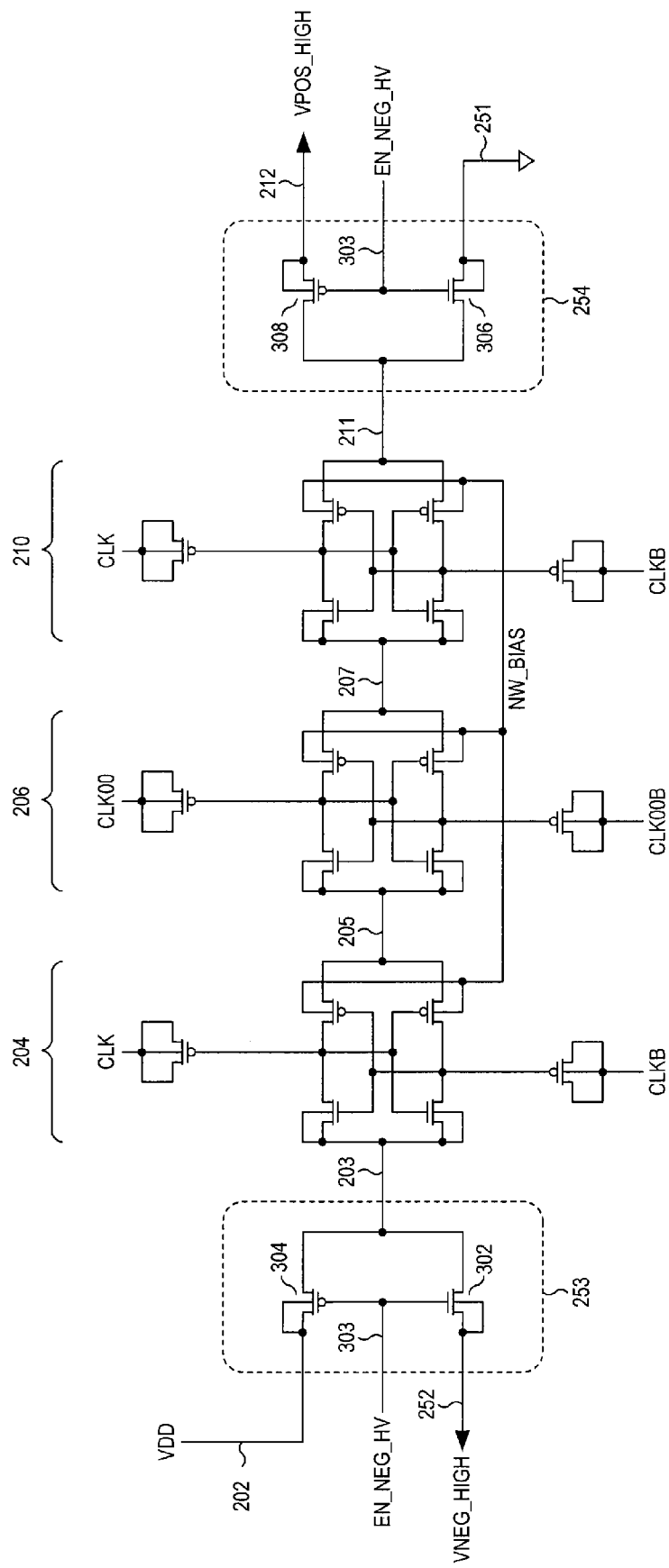
FIG. 4 depicts an exemplary transistor-level implementation of the circuit depicted in FIG. 3.

Referring now to FIG. 4, an exemplary implementation of such a charge pump circuit 250 is depicted, utilizing three series-coupled charge pump stages rather than four such stages. The first switch circuit 253 is implemented using an NMOS transistor 302 and a PMOS transistor 304, both responsive to a control signal EN_NEG_HV (also labeled 303). Similarly, the second switch circuit 254 is implemented using an NMOS transistor 306 and a PMOS transistor 308, both responsive to the same control signal EN_NEG_HV.

To configure the charge pump circuit to generate a negative voltage, the control signal EN_NEG_HV is driven to a high voltage, preferably to the VDD voltage (e.g., 3.3 volts). Consequently transistor 302 is turned on to couple the input terminal 203 of charge pump stage 204 to the negative output node 252, transistor 304 is turned off, transistor 306 is turned on to couple the output terminal 211 of charge pump stage 210 to the second voltage node 251 (i.e., ground), and transistor 308 is turned off.

To configure the charge pump circuit to generate a positive voltage, the control signal EN_NEG_HV is driven to a low voltage, preferably to the GND voltage (or even below ground). Consequently transistor 304 is turned on to couple the input terminal 203 of charge pump stage 204 to the voltage node 202, transistor 302 is turned off, transistor 308 is turned on to couple the output terminal 211 of charge pump stage 210 to the output node 212, and transistor 306 is turned off.

Figure 5:
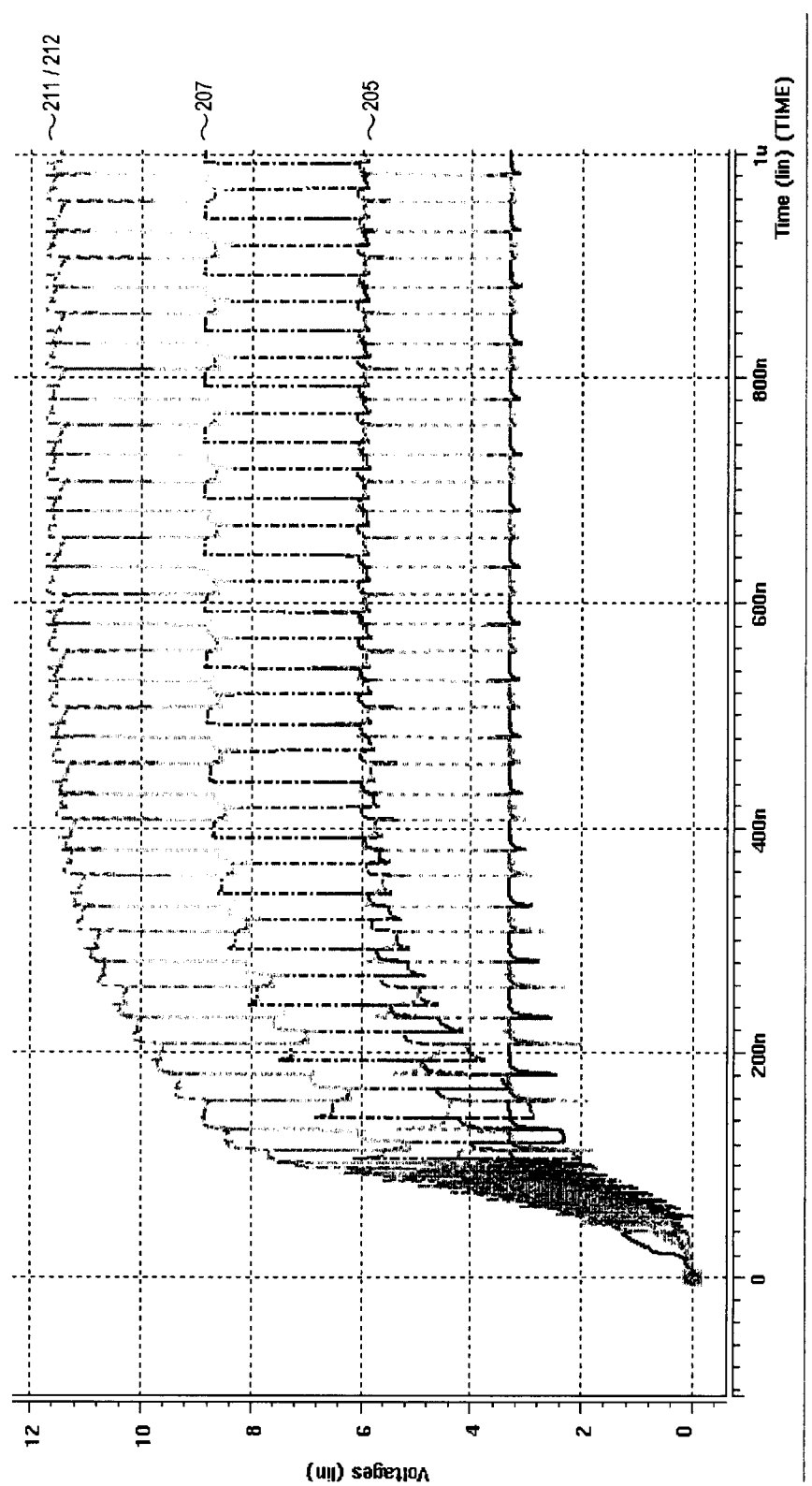
FIG. 5 depicts exemplary waveforms of the charge pump circuit illustrated in FIG. 4 when configured to generate a positive output voltage.

FIG. 5 illustrates waveforms of the charge pump circuit 300 when configured to generate a positive output voltage VPOS_HIGH. The VDD voltage is approximately 3.3 volts, and each successive charge pump stage output achieves a higher voltage. The output node 212 is shown achieving a VPOS_HIGH voltage of approximately 11.5 volts.

Figure 6:
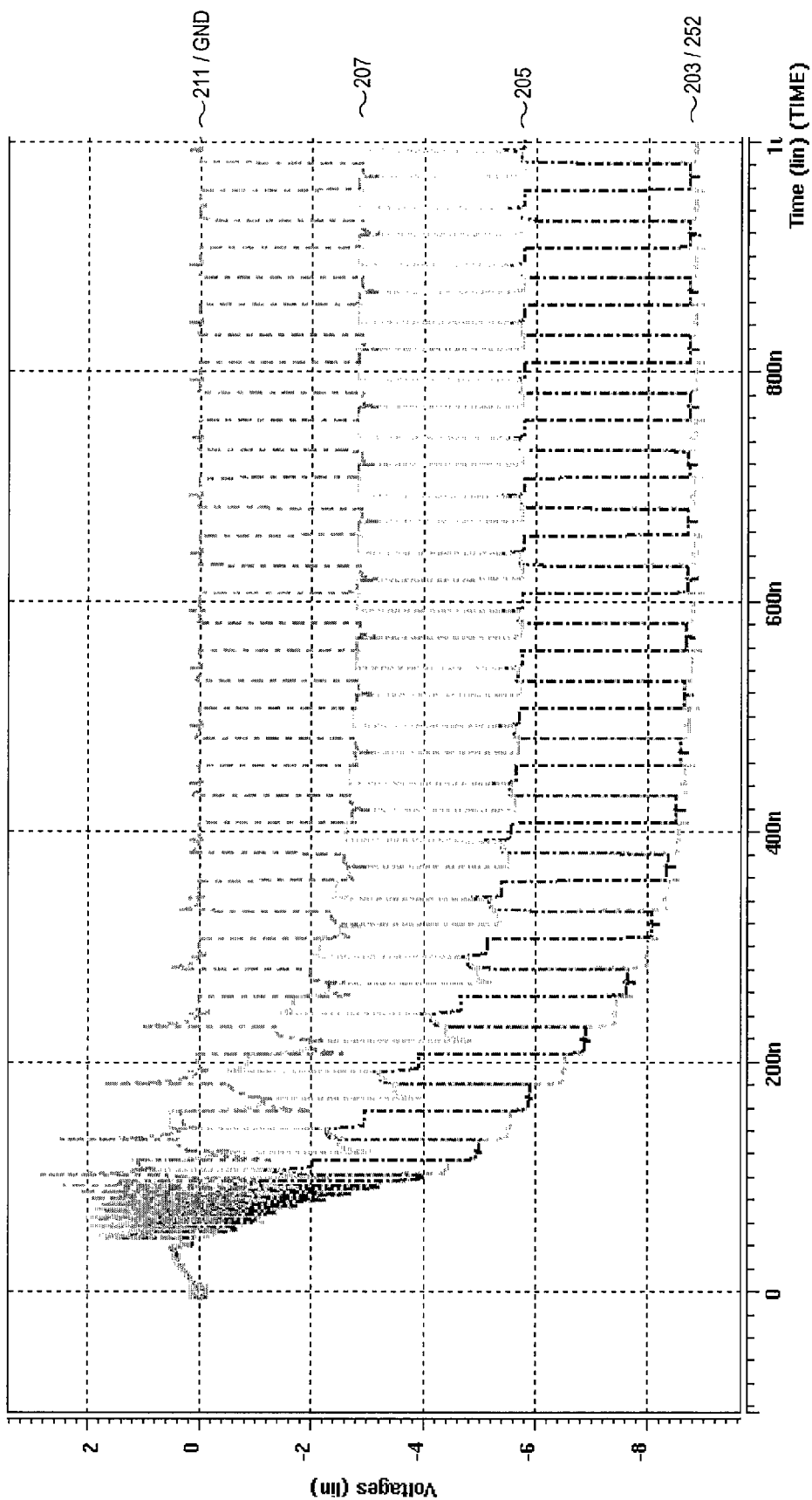
FIG. 6 depicts exemplary waveforms of the charge pump circuit illustrated in FIG. 4 when configured to generate a negative output voltage.

FIG. 6 illustrates waveforms of the charge pump circuit 300 when configured to generate a negative output voltage VNEG_HIGH. The VDD voltage is again approximately 3.3 volts, and each successive charge pump stage output achieves a more negative (i.e., lower) voltage. The output node 252 is shown achieving a VNEG_HIGH voltage of approximately −9.0 volts.

Figure 7:
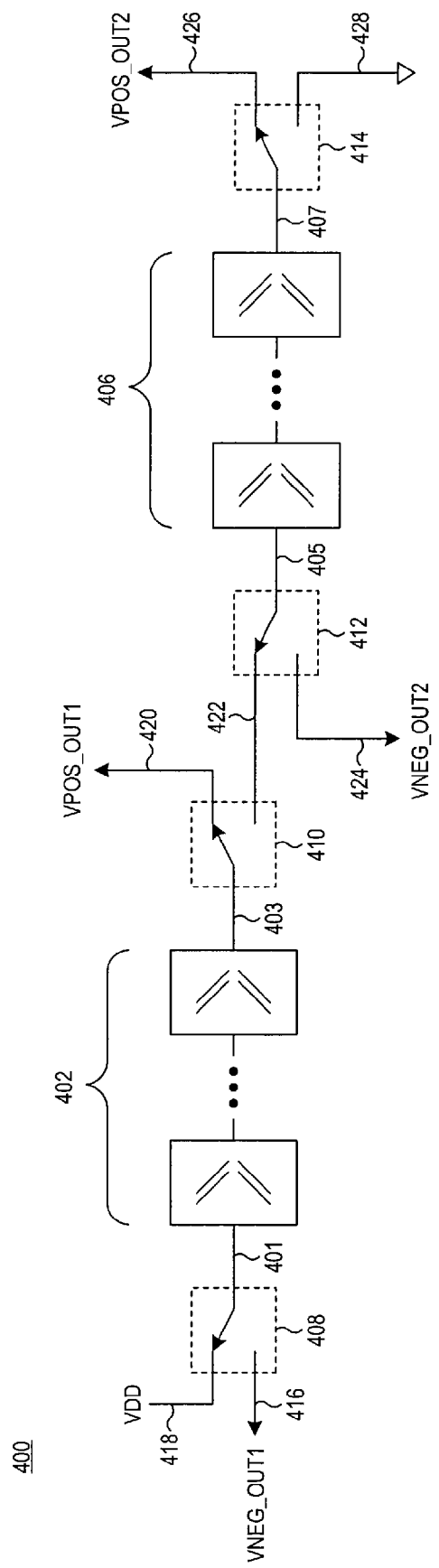
FIG. 7 depicts an embodiment includes two multi-stage charge pump circuits, each of which can operate independently of the other to generate a respective high or low output voltage, but can also cooperate to generate a higher magnitude positive or negative voltage than either can generate alone.

The above embodiments may be viewed as a plurality of series-coupled charge pump stages, which may be configured to generate a positive voltage, and may be configured in reverse to generate a negative voltage. Other charge pump circuit configurations are contemplated which can provide additional output voltage/current options. For example, FIG. 7 depicts a circuit 400 that includes a first multi-stage charge pump circuit 402 (i.e., two or more series-coupled charge pump stages, as shown), and a second multi-stage charge pump circuit 406 (i.e., also having two or more series-coupled charge pump stages, as shown). Each charge pump circuit 402, 406 can operate independently of the other to generate a respective high or low output voltage, but both charge pump circuits 402, 406 can be configured to cooperate and generate a higher magnitude positive or negative voltage than either can generate alone.

For example, in one configuration, the circuit 400 may be configured to generate a single positive high voltage on VPOS_OUT2 output node 426. To accomplish this, the switch circuit 408 couples the input node 401 of the charge pump circuit 402 to voltage node 418 (i.e., VDD), the switch circuit 410 couples the output node 403 of the charge pump circuit 402 to node 422, the switch circuit 412 couples the input node 405 of the charge pump circuit 406 to node 422, and the switch circuit 414 couples the output node 407 of the charge pump circuit 406 to output node 426. This results in an equivalent configuration like that shown in FIG. 2.

In another configuration, the circuit 400 may be configured to generate a positive high voltage on VPOS_OUT1 output node 420, and a negative high voltage on VNEG_OUT2 output node 424. To accomplish this, the switch circuit 408 couples the input node 401 of the charge pump circuit 402 to VDD voltage node 418, the switch circuit 410 couples the output node 403 of the charge pump circuit 402 to VPOS_OUT1 output node 420, the switch circuit 412 couples the input node 405 of the charge pump circuit 406 to the VNEG_OUT2 output node 424, and the switch circuit 414 couples the output node 407 of the charge pump circuit 406 to the voltage node 428 (i.e., conveying a ground potential). Neither charge pump circuit is coupled to node 422, and both operate independently, each in the fashion as respectively described earlier above.

In yet another configuration, the circuit 400 may be configured to generate a single negative high voltage on VNEG_OUT1 output node 416. To accomplish this, the switch circuit 408 couples the input node 401 of the charge pump circuit 402 to the VNEG_OUT1 output node 416, the switch circuit 410 couples the output node 403 of the charge pump circuit 402 to node 422, the switch circuit 412 couples the input node 405 of the charge pump circuit 406 to node 422, and the switch circuit 414 couples the output node 407 of the charge pump circuit 406 to the ground voltage node 428.

In other embodiments, additional switch circuits may be included at the ends of each charge pump circuit for connecting the respective end to a one or more voltage nodes. Each of these voltage nodes may be a power node (e.g., a "power supply" voltage, a ground voltage, an internally generated voltage functioning as a veritable power supply voltage, etc.), or may be a node generated by another charge pump circuit. For example, the switch circuit 412 may be viewed as coupling the input node of the charge pump circuit 406 to either an output node 424 or to a voltage node 422. In this case the voltage node 422 is coupled to the output node (assuming the switch circuit 410 is connected appropriately) of the charge pump circuit 402 and conveys the voltage generated by such charge pump circuit. It should be appreciated that each of the charge pump circuits 402, 406 may include different numbers of individual charge pump stages, including perhaps a single stage, although more likely each includes two or more such charge pump stages.

In an additional embodiment, the switch circuit 410 includes a switch leg for coupling node 403 to ground (or alternatively, includes another switch circuit for so doing). As a result, both the charge pump circuits 402 and 406 can both simultaneously generate negative output voltages independently of each other, yet may be coupled together to cooperatively generate a much larger magnitude positive or negative voltage.

In yet another additional embodiment, the switch circuit 412 includes a switch leg for coupling node 405 to VDD (or alternatively, includes another switch circuit for so doing). As a result, both the charge pump circuits 402 and 406 can both simultaneously generate positive output voltages independently of each other, yet may be coupled together to cooperatively generate a much larger magnitude positive or negative voltage.

Figure 8:
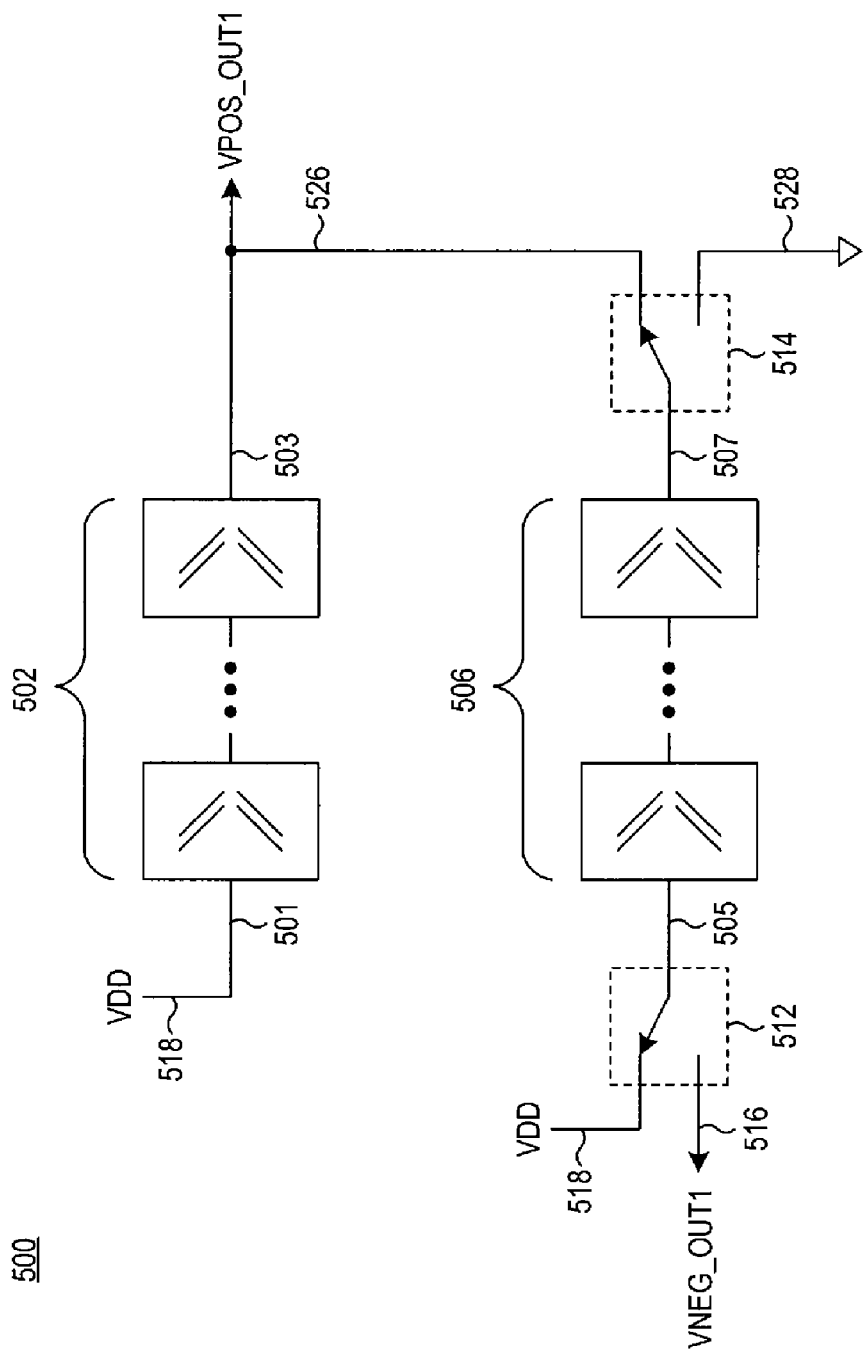
FIG. 8 depicts another embodiment illustrating cooperation, at times, between two multi-stage charge pump circuits, and independent operation at other times.

Such cooperation between charge pump circuits may result in generating an output having a higher voltage than either can generate alone, as is shown in the above embodiments, or may result in generating an output having a higher current capability than either can generate alone. For example, FIG. 8 depicts a circuit 500 including a pair of charge pump circuits that cooperate to generate an output having a higher current capability than either can generate alone. In this embodiment, a first charge pump circuit 502 and a second charge pump circuit 506 are coupled in parallel to generate a positive high output voltage VPOS_OUT1 at a high current. In another mode, the first charge pump circuit 502 operates as before to generate the same positive high output voltage VPOS_OUT1 at a lower current, and the second charge pump circuit 506 is "reversed" to generate a negative high output voltage VNEG_OUT1. To do so, the switch circuit 512 is configured to couple the input node 505 of the charge pump circuit 506 to the VNEG_OUT1 node 516, and switch circuit 514 is configured to couple the output node 507 of the charge pump circuit 506 to the ground voltage node 528, and both charge pump circuits 502, 506 operate independently. It should be appreciated that the upper charge pump circuit 502, in other embodiments, could also include one or more switch circuits such as those described in FIG. 7 to provide additional configuration flexibility to the upper charge pump circuit 502.

As may be appreciated, a great many variations of one or more charge pump circuits may be arranged based upon the teaching of this invention. It may also be appreciated in the above embodiments that the source and drain terminals of certain ones of the NMOS transistors at times are driven to a voltage above VDD when configured to generate a positive output voltage, and at other times are driven to a voltage below VSS when configured to generate a negative output voltage (i.e., NMOS source and drains driven below the bulk substrate voltage). This is provided for by utilizing a triple-well N-channel technology.

Figure 9:
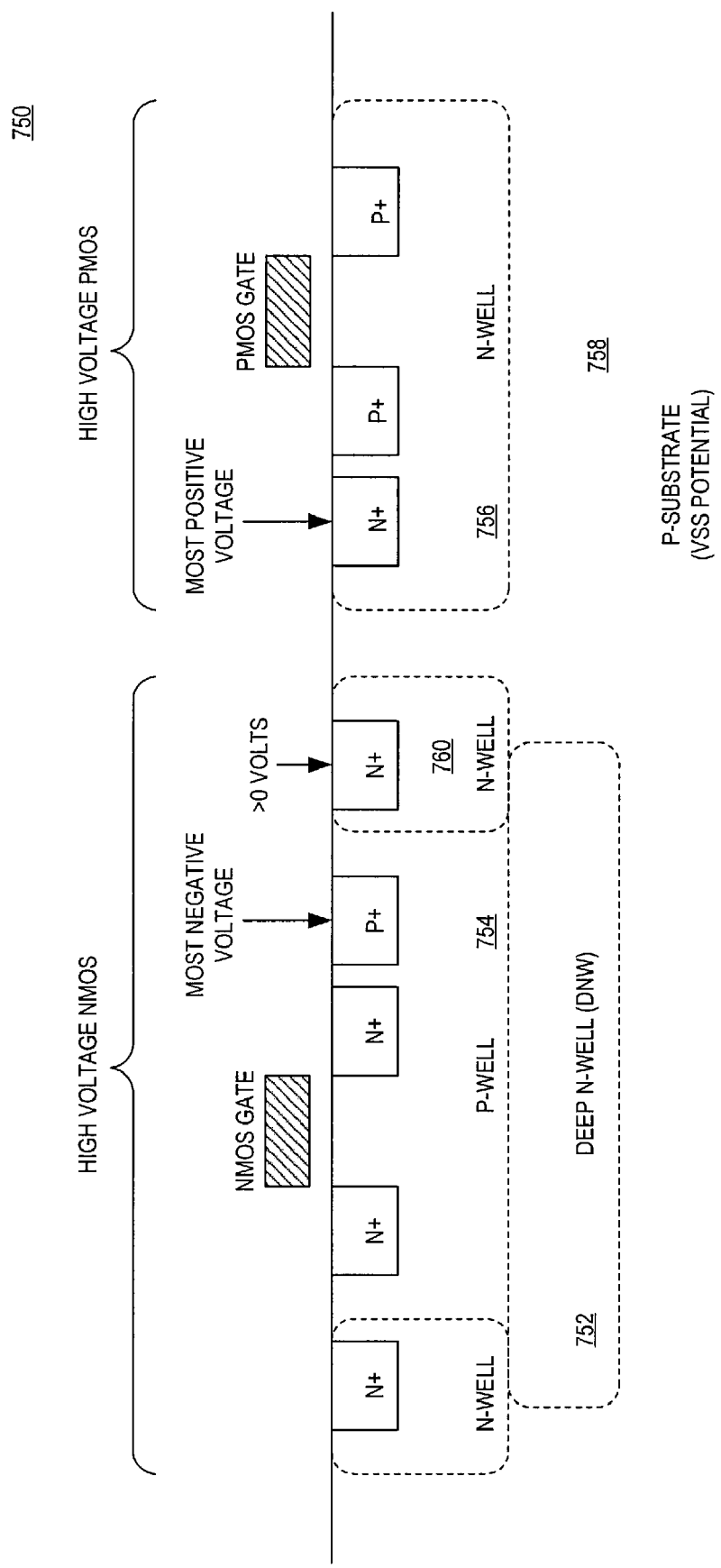
FIG. 9 depicts a triple-well N-channel process technology useful for fabricating the present invention.

An exemplary triple-well semiconductor structure is shown in FIG. 9. The PMOS devices (e.g., a representative one shown on the right side of the figure) are formed in a traditional N-well 756. The NMOS devices (e.g., a representative one shown on the left side of the figure) are enclosed in a triple well structure where an intermediate depth P-well 754 is surrounded by a deep N-well 752. All the N-wells 756 for the PMOS devices share the most positive voltage in each mode of operation, and all the P-wells 754 for the NMOS devices share the most negative voltage in each mode of operation.

The invention is expected to be useful in numerous circuits incorporating any of a wide variety of devices and structures. However, the invention is particularly beneficial when used with certain erasable memory array technologies, such as those incorporating certain resistive passive element memory cells. Such cells tend to have high leakage current when programming and erasing, and a memory array therefore requires large currents at the required programming and erasing voltages. For example, in a program operation, the positive voltage charge pump may need to deliver a particularly high value of output current, while in an erase operation the negative voltage charge pump may need to deliver a particularly high value of output current (e.g., greater than any current needed at a boosted positive voltage). This is particularly true in a three-dimensional memory array.

Such large output currents require large charge pumps. However, it is undesirable to build two very large charge pumps if one of them (e.g., a negative voltage charge pump) is only utilized for certain mode(s) of operation. A multiple polarity reversible charge pump circuit, as described herein, allows a much smaller, lower power charge pump circuit to generate the required voltages at the required output currents. This efficiency results from using the resources of each charge pump stage (i.e., principally the pump capacitors, but also the charge transfer switch devices within each stage) for each mode of operation. In other words, all of the charge pump capacitors fully participate in the pumping, for each mode of operation.

To more fully appreciate the usefulness of the various charge pump circuits described above, an exemplary memory technology and corresponding array line bias voltages will be described. FIG. 10 is a schematic diagram of an exemplary passive element memory array 100 incorporating variable resistance memory cells. Two word lines 102, 104 are shown, as well as two bit lines 106, 108. Word line 102 is assumed to be a selected word line (SWL), and word line 104 is assumed to be an unselected word line (UWL). Similarly, bit line 106 is assumed to be a selected bit line (SBL), and bit line 108 is assumed to be an unselected bit line (UBL). Four passive element memory cells 101, 103, 105, 107 are shown, each coupled between an associated word line and an associated bit line.

Memory cell 101 is associated with the selected word line 102 and the selected bit line 106, and may be viewed as an "S" cell (i.e., "selected" cell). Memory cell 103 is associated with the unselected word line 104 and the selected bit line 106, and may be viewed as an "F" cell (i.e., "off" cell). Memory cell 105 is associated with the selected word line 102 and the unselected bit line 108, and may be viewed as an "H" cell (i.e., "half-selected" cell). Lastly, memory cell 107 is associated with the unselected word line 104 and the unselected bit line 108, and may be viewed as a "U" cell (i.e., "unselected" cell).

Also illustrating in FIG. 10 are exemplary biasing conditions for a forward bias mode of operation. Such a forward bias mode may be used for a programming mode, a block erase mode, and a read mode (although usually with different voltage levels or conditions for such different modes). As shown, the bias conditions may be viewed as appropriate for a programming mode of operation for a selected array block, and will be described as such.

The selected word line 102 is biased at a VSX voltage (e.g., ground), the selected bit line 106 biased at a VSB voltage (e.g., +8 volts), the unselected word line 104 is biased at a VUX voltage (e.g., +7.3 volts), and the unselected bit line 108 biased at a VUB voltage (e.g., +0.7 volts). The selected bit line bias voltage VSB may be viewed as the programming voltage VPP, as substantially this entire voltage is impressed across the selected memory cell 101 (since the selected word line is biased at ground), less certain resistive drops in the busses and array lines themselves. The unselected bit line bias voltage VUB is also preferably set at a value corresponding to an apparent "threshold voltage" in a forward biased direction of each memory cell, and is thus shown as a voltage VT being impressed on the unselected bit line 108. Similarly, the unselected word line bias voltage VUX is also preferably set at a value of VPP—VT.

Under these biasing conditions, the S cell 101 receives a forward bias voltage equal to VPP (e.g., +8 volts), the F cell 103 receives a forward bias voltage equal to VT (e.g., +0.7 volts), the H cell 105 receives a forward bias voltage equal to VT (e.g., +0.7 volts), and the U cell 107 receives a reverse bias voltage equal to VPP—2VT (e.g., −6.6 volts). There are several exemplary memory cell technologies that, when biased under these conditions, the selected cell will be changed to a lower value of resistance, while the F, H, and U cells will not appreciably change in resistance. Exemplary cells are described herebelow.

Referring now to FIG. 11, exemplary biasing conditions 120 are shown for a reverse bias mode of operation. Such a reverse bias mode may be used for a programming mode or a block erase mode (although usually with different conditions for such different modes). As shown, the bias conditions may be viewed as appropriate for either a programming mode or erase mode of operation for a selected array block, and will be described as such.

Each of the bias conditions VSX, VUX, VSB, and VUB are now redefined for values appropriate for the present mode of operation. The selected word line 102 is biased at a VSX voltage of VRR/2 (e.g., +6 volts), and the selected bit line 106 biased at a VSB voltage of —VRR/2 (e.g., −6 volts). The unselected word line voltage VUX and the unselected bit line voltage VUB are both ground.

Under these biasing conditions, the S cell 101 receives a reverse bias voltage equal in magnitude to VRR (e.g., −12 volts), the F cell 103 receives a reverse bias voltage equal to VRR/2 (e.g., −6 volts), and the H cell 105 receives a reverse bias voltage equal to VRR/2 (e.g., −6 volts). Of note, the U cell 107 receives no bias across the cell.

There are several exemplary memory cell technologies (referenced below) that, when biased under these conditions, the selected cell will be changed from a lower value of resistance to a higher value of resistance, while the F, H, and U cells will not appreciably change in resistance. It should also be noted that the unselected U memory cells, which otherwise may support a considerable amount of leakage current when biased with several volts across such a cell, have no bias and therefore no leakage current. As will be described in further detail, many useful memory array embodiments include a far larger number of U cells than H cells of F cells, and such arrays will have significantly less leakage current in the unselected memory cells of the array, and hence much less power dissipation, than with other biasing schemes.

By "splitting" the VRR voltage in this reverse mode, and biasing the SBL at a negative voltage equal to one half of the programming voltage, and biasing the SWL at a positive voltage equal to one half of the programming voltage, the voltage requirements of both the bit line decoder and the word line decoder are significantly relaxed. Consequently, consistent with the small pitch of the array lines (e.g., word lines and bit lines), the high voltage transistors in the array line driver circuits take up less area because they may be designed for a relatively lower "split" voltage.

Additional description of such a memory array, including exemplary decoding circuits and array biasing circuits, is provided in U.S. application Ser. No. 11/461,352 (filed Jul. 31, 2006, entitled "Dual Data-Dependent Busses for Coupling Read/Write Circuits to a Memory Array" by Roy E. Scheuerlein and Luca G. Fasoli, the disclosure of which is hereby incorporated by reference in its entirety.

As may be appreciated by the descriptions above, in the forward mode of operation only positive voltages are required, although the large leakage currents require such voltages (particularly the VPP—VT bias voltage) be generated with a high current capability. However, in the reverse mode of operation, both positive and negative voltages are required, each at a lower magnitude than the VPP—VT voltage, and each requiring less output current capability. A triple well semiconductor structure (described above) allows the selected bit line(s) to be taken to a negative voltage while the selected word line(s) is taken to a positive voltage.

It may be appreciated that charge pump circuits as described herein may be advantageously utilized to provide, in a set mode of operation, a positive voltage (e.g., generated by two cooperating multi-stage charge pump circuits) that is coupled to both certain word lines and bit lines, and to provide, in the reset mode, a positive voltage to certain word lines and a negative voltage to certain bit lines (e.g., generated by the two multi-stage charge pump circuits operating independently).

In the embodiments described, it is contemplated that a given charge pump circuit will likely be configured to generate a single output voltage for a given mode of operation, since a multi-stage charge pump circuit requires a period of time to charge each intermediate stage before achieving its final output voltage. Nonetheless, it is contemplated that a single multiple polarity charge pump circuit as described herein may be used to switch rapidly enough between operation modes to simultaneously generate two voltages for use by a circuit at the same time.

While the embodiments described above show complementary charge pump stages, any directional charge pump stage may be utilized to achieve some benefit of the present invention. As used herein, a "voltage node" can include a power node, and can include the output of another multi-stage charge pump circuit. A "power node" can include a positive voltage supply node, a negative voltage supply node, or a ground node.

As used herein, two circuits described as being coupled in parallel may be coupled through another node. For example, two charge pump circuits may be described as being coupled in parallel if the respective first end of each charge pump circuit is coupled to the same power supply node (e.g., VDD) and the respective second end of each charge pump circuit is coupled to the same output node.

The term "reversible" as applied herein to a charge pump circuit does not mean that charge transfer takes place in the opposite direction, but rather that the output is taken from the opposite end of the charge pump circuit in the "reverse" mode. Designations herein of a first, second, third, etc. element in the specification do not necessarily require the claims to be so interpreted using the same relative numbering of elements. Any alignment of such relative numbering should be taken as coincidental and not controlling.

In some integrated circuit devices, it may be useful to implement more than one charge pump circuit. For example, in a memory device having more than one memory sub-array, a different charge pump circuit may be associated with each of several memory sub-arrays, or a different charge pump circuit may be associated with all such sub-arrays. For certain memory technologies in which the array is fabricated on layers other than the substrate, such as for a monolithic three-dimensional memory array fabricated above a semiconductor substrate, such a charge pump circuit may be implemented beneath a memory sub-array, rather than requiring area outside of the memory array. Exemplary monolithic three-dimensional memory arrays which may be fabricated above a semiconductor substrate are described in U.S. Pat. No. 6,034,882 to Johnson, et al.; in U.S. Pat. No. 6,420,215 to N. Johan Knall, et al.; in U.S. Pat. No. 6,525,953 to Johnson, et al.; in U.S. Pat. No. 6,952,043 to Vyvoda, et al.; and in U.S. Pat. No. 6,545,898 to Scheuerlein, et al., the disclosures of which are hereby incorporated by reference in their entirety.

As used herein, an integrated circuit having a three-dimensional memory array is assumed to be a monolithic integrated circuit, rather than an assembly of more than one monolithic integrated circuit. The methods and apparatus of the present invention may also be used to advantage in monolithic three dimensional memories such as, for example, a three-dimensional, non-volatile, field-programmable memory array (both write-once and/or re-writable memory arrays). Moreover, the methods and apparatus of the present invention may also be used to advantage in integrated circuits including two-dimensional arrays, and in many other non-memory integrated circuits.

Many types of memory cells are capable of being programmed using a reverse bias (e.g., the reset mode described above). Such cells include a passive element cell having a metal oxide (e.g., a transition metal oxide) and a diode. Other suitable cells include those having a resistive material being programmed between a low R state and a high R state with a diode select element. Examples include a programmable metallization connection, a phase change resistor such as GST material, an organic material variable resistor, a complex metal oxide, a carbon polymer film, a carbon nanotube resistor, a doped chalcogenide glass, and a Schottky barrier diode containing mobile atoms to change resistance. The resistive material chosen may provide one-time-programmable (OTP) memory cells, or write-many memory cells. In addition, a polysilicon diode could be employed having conduction modified by reverse bias stress.

Descriptions of useful two-terminal memory cells are provided in the following papers which are hereby incorporated herein by reference: (i) Pirovano et al., "Electronic Switching in Phase-Change Memories," IEEE Transactions on Electronic Devices, Vol. 51, No. 3, March 2003; (ii) Baek et al., "Multi-layer Cross-point Binary Oxide Resistive Memory (OXRRAM) for Post-NAND Storage Application," IEEE International Electron Devices Meeting, 2005; (iii) Baek et al., "Highly Scalable Non-volatile Resistive Memory using Simple Binary Oxide Driven by Asymmetric Unipolar Voltage Pulses," IEEE International Electron Devices Meeting, 2004; and (iv) Hwang et al., "Writing Current Reduction for High-Density Phase-Change RAM," IEEE International Electron Devices Meeting, 2003. Additional details are also provided in U.S. Pat. No. 6,891,748, which is hereby incorporated herein by reference.

Useful memory cells for reverse reset operation are described in U.S. Pat. No. 6,952,030 entitled "High-Density Three-Dimensional Memory Cell" to S. Brad Herner, et al.; and also in U.S. application Ser. No. 11/237,167 entitled "Method for Using a Memory Cell Comprising Switchable Semiconductor Memory Element with Trimmable Resistance" by Tanmay Kumar, et al., filed on Sep. 28, 2005, now published as U.S. Patent Application Publication No. 2007-

0090425. A suitable metal oxide memory cell is shown in U.S. application Ser. No. 11/394,903 filed on Mar. 31, 2006, entitled "Multilevel Nonvolatile Memory Cell Comprising a Resistivity-Switching Oxide or Nitride and an Antifuse" by S. Brad Herner. A suitable memory cell using a phase change material, which can provide multiple resistance states, is shown in U. S. Patent Application Publication No. 2005-0158950 entitled "Non-Volatile Memory Cell Comprising a Dielectric Layer and a Phase Change Material in Series" by Roy B. Scheuerlein, et al. Each of these above-referenced disclosures is incorporated herein by reference in its entirety. Other exemplary memory cells having a transition-metal oxide (e.g., including those having cobalt), and exemplary cells in which the polysilicon material of the steering element itself comprises the switchable resistance material, are described in U.S. application Ser. No. 11/496,986, now U.S. Patent Application Publication No. 2007/0072360, filed Jul. 31, 2006 entitled "Method for Using a Memory Cell Comprising Switchable Semiconductor Memory Element with Trimmable Resistance" by Tanmay Kumar, S. Brad Herner, Roy S. Scheuerlein, and Christopher J. Petti (the "MA-163-1" application), which is incorporated herein by reference in its entirety.

In addition, U.S. application Ser. No. 11/125,939 filed on May 9, 2005, entitled "Rewritable Memory Cell Comprising a Diode and a Resistance Switching Material" by S. Brad Herner, et al., discloses a useful rewritable memory cell incorporating a diode in series with an oxide, such as a nickel oxide, in which the resistance of the memory cell may be repeatedly switched from low to high and from high to low resistance states. U.S. application Ser. No. 11/395,995 filed on Mar. 31, 2006, entitled "Nonvolatile Memory Cell Comprising a Diode and a Resistance Switching Material" by S. Brad Herner, et al., discloses a OTP multi-level memory cell which is set using forward bias and reset using reverse bias. Each of these above-referenced disclosures is incorporated herein by reference in its entirety.

As used herein, and unless the context requires otherwise, a "complementary pair" of clock signals or pulse signals need not precisely be at all times complementary, but is meant to include a pair of signals that are only generally complementary. For example, the complementary clock signals may overlap during each such signal's transition from high to low and from low to high. In some embodiments, the clocks may be adjusted to have non-overlapping positive pulses.

As used herein, the amplitude of a signal (e.g., such as a clock signal) refers to the difference in voltage between the high level and the low level of the signal. If such a signal has VSS or the ground reference as its low level, and VDD for its high level, the signal may be termed a VDD-level signal or a full VDD-level signal.

Regarding general terminology used herein, it will be appreciated by one skilled in the art that any of several expressions may be equally well used when describing the operation of a circuit including the various signals and nodes within the circuit. Any kind of signal, whether a logic signal or a more general analog signal, takes the physical form of a voltage level (or for some circuit technologies, a current level) of a node within the circuit. It may be correct to think of signals being conveyed on wires or buses. For example, one might describe a particular circuit operation as "the output of circuit 10 drives the voltage of node 11 toward VDD, thus asserting the signal OUT conveyed on node 11." This is an accurate, albeit somewhat cumbersome expression. Consequently, it is well known in the art to equally describe such a circuit operation as "circuit 10 drives node 11 high," as well as "node 11 is brought high by circuit 10," "circuit 10 pulls the OUT signal high" and "circuit 10 drives OUT high." Such shorthand phrases for describing circuit operation are more efficient to communicate details of circuit operation, particularly because the schematic diagrams in the figures clearly associate various signal names with the corresponding circuit blocks and node names. For convenience, an otherwise unnamed node conveying the CLK signal may be referred to as the CLK node. Similarly, phrases such as "pull high," "drive high," and "charge" are generally synonymous unless otherwise distinguished, as are the phrases "pull low," "drive low," and "discharge." It is believed that use of these more concise descriptive expressions enhances clarity and teaching of the disclosure. It is to be appreciated by those skilled in the art that each of these and other similar phrases may be interchangeably used to describe common circuit operation, and no subtle inferences should be read into varied usage within this description.

Regarding power supplies, a single positive power supply voltage (e.g., a 3.3 volt power supply) used to power a circuit is frequently named the "VDD" power supply. In an integrated circuit, transistors and other circuit elements are actually connected to a VDD terminal or a VDD node, which is then operably connected to the VDD power supply. The colloquial use of phrases such as "tied to VDD" or "connected to VDD" is understood to mean "connected to the VDD node", which is typically then operably connected to actually receive the VDD power supply voltage during testing or use of the integrated circuit.

The reference voltage for such a single power supply circuit is frequently called "VSS." Transistors and other circuit elements are actually connected to a VSS terminal or a VSS node, which is then operably connected to the VSS power supply during use of the integrated circuit. Frequently the VSS terminal is connected to a ground reference potential, or just "ground." Describing a node which is "grounded" by a particular transistor or circuit (unless otherwise defined) means the same as being "pulled low" or "pulled to ground" by the transistor or circuit.

Generalizing somewhat, the first power supply terminal is frequently named "VDD", and the second power supply terminal is frequently named "VSS." Both terms may appear either using subscripts (e.g., VDD) or not. Historically the nomenclature "$V_{DD}$" implied a DC voltage connected to the drain terminal of an MOS transistor and $V_{SS}$ implied a DC voltage connected to the source terminal of an MOS transistor. For example, old PMOS circuits used a negative VDD power supply, while old NMOS circuits used a positive VDD power supply. Common usage, however, frequently ignores this legacy and uses VDD for the more positive supply voltage and VSS for the more negative (or ground) supply voltage unless, of course, defined otherwise. Describing a circuit as functioning with a "VDD supply" and "ground" does not necessarily mean the circuit cannot function using other power supply potentials. Other common power supply terminal names are "VCC" (a historical term from bipolar circuits and frequently synonymous with a +5 volt power supply voltage, even when used with MOS transistors which lack collector terminals) and "GND" or just "ground."

The block diagrams herein may be described using the terminology of a single node connecting the blocks. Nonetheless, it should be appreciated that, when required by the context, such a "node" may actually represent a pair of nodes for conveying a differential signal, or may represent multiple separate wires (e.g., a bus) for carrying several related signals or for carrying a plurality of signals forming a digital word. As used herein, coupling includes both direct and indirect (i.e., through intervening structures or node) coupling.

The circuit structures described herein may be implemented using discrete circuit elements, but are more likely to be fashioned in an integrated circuit using techniques described herein and other well known semiconductor processing techniques.

While circuits and physical structures are generally presumed, it is well recognized that in modern semiconductor design and fabrication, physical structures and circuits may be embodied in computer readable descriptive form suitable for use in subsequent design, test or fabrication activities as well as in resultant fabricated semiconductor integrated circuits. Accordingly, claims directed to traditional circuits or structures may, consistent with particular language thereof, read upon computer readable encodings and representations of same, whether embodied in media or combined with suitable reader facilities to allow fabrication, test, or design refinement of the corresponding circuits and/or structures. The invention is contemplated to include circuits, related methods or operation, related methods for making such circuits, and computer-readable medium encodings of such circuits and methods, all as described herein, and as defined in the appended claims. As used herein, a computer-readable medium includes at least disk, tape, or other magnetic, optical, semiconductor (e.g., flash memory cards, ROM), or electronic medium and a network, wireline, wireless or other communications medium. An encoding of a circuit may include circuit schematic information, physical layout information, behavioral simulation information, and/or may include any other encoding from which the circuit may be represented or communicated.

The foregoing detailed description has described only a few of the many possible implementations of the present invention. For this reason, this detailed description is intended by way of illustration, and not by way of limitations. Variations and modifications of the embodiments disclosed herein may be made based on the description set forth herein, without departing from the scope and spirit of the invention. Moreover, the embodiments described above are specifically contemplated to be used alone as well as in various combinations. It is only the following claims, including all equivalents, that are intended to define the scope of this invention. Accordingly, other embodiments, variations, and improvements not described herein are not necessarily excluded from the scope of the invention.

What is claimed is:

1. A circuit comprising:
   a first multi-stage charge pump circuit comprising a plurality of series-connected directional pump stages, each respective stage configured to transfer charge from a respective input thereof to a respective output thereof;
   said first multi-stage charge pump circuit selectable to develop a positive voltage on an output node of the first charge pump circuit for a first mode of operation, and selectable to develop a negative voltage on another output node of the first charge pump circuit for a second mode of operation; and
   a second multi-stage charge pump circuit, coupled in cooperation with the first multi-stage charge pump circuit to generate a single output voltage at times, and decoupled to operate independently so that the first and second charge pump circuits generate separate output voltages at other times.

2. The circuit as recited in claim 1 wherein:
   each directional pump stage comprises one or more pump capacitors; and
   each directional pump stage is utilized to generate the positive voltage output and also utilized to generate the negative voltage output.

3. The circuit as recited in claim 1 wherein:
   the circuit is fabricated using a triple well semiconductor technology to allow at times positive voltages and at other times negative voltages on circuit nodes within the plurality of pump stages with respect to a bulk substrate potential.

4. The circuit as recited in claim 1 wherein:
   each pump stage comprises a pair of charge transfer switch circuits, each operating substantially out of phase with the other.

5. The circuit as recited in claim 1 wherein:
   in the first mode of operation, a first end of said plurality of series-connected pump stages is coupled to a first voltage node, and a second end of said plurality of series-connected pump stages is coupled to a second output node of the first charge pump circuit; and
   in the second mode of operation, the second end of said plurality of series-connected pump stages is coupled to a second voltage node, and the first end of said plurality of series-connected pump stages is coupled to a first output node of the first charge pump circuit.

6. The circuit as recited in claim 5 wherein:
   the first voltage node conveys a first voltage that is greater than a second voltage conveyed on the second voltage node;
   the second output node conveys, in the first mode of operation, a voltage greater than the first voltage conveyed on the first voltage node; and
   the first output node conveys, in the second mode of operation, a voltage less than the second voltage conveyed on the second voltage node.

7. The circuit as recited in claim 5 further comprising:
   a first switch circuit for coupling the first end of said plurality of series-connected pump stages at times to the first voltage node and at other times to the first output node; and
   a second switch circuit for coupling the second end of said plurality of series-connected pump stages at times to the second voltage node and at other times to the second output node.

8. The circuit as recited in claim 7 wherein:
   the first switch circuit comprises a first transistor for coupling the first end to the first voltage node, and a second transistor for coupling the first end to the first output node; and
   the second switch circuit comprises a third transistor for coupling the second end to the second voltage node, and a fourth transistor for coupling the second end to the second output node.

9. The circuit as recited in claim 1 wherein:
   the cooperation results in a larger output current for the single output voltage than without such cooperation.

10. The circuit as recited in claim 9 wherein:
    in the first mode of operation, the first and second multi-stage charge pump circuits cooperate to generate a positive voltage having a larger output current for the single output voltage than without such cooperation; and
    in the second mode of operation, the first and second multi-stage charge pump circuits operate independently, one generating a positive voltage and the other generating a negative voltage.

11. The circuit as recited in claim 9 wherein:
in one of the first and second modes of operation, the first and second multi-stage charge pump circuits are coupled at the respective ends thereof in parallel.

12. The circuit as recited in claim 11 wherein:
in the other of the first and second modes of operation, the first and second multi-stage charge pump circuits operate independently, one generating a positive voltage and the other generating a negative voltage.

13. The circuit as recited in claim 1 wherein:
the cooperation results in a larger output voltage for the single output voltage than without such cooperation.

14. The circuit as recited in claim 13 wherein:
in the first mode of operation, the first and second multi-stage charge pump circuits cooperate to generate a positive voltage having a larger output voltage than without such cooperation; and
in the second mode of operation, the first and second multi-stage charge pump circuits operate independently, one generating a positive voltage and the other generating a negative voltage.

15. The circuit as recited in claim 13 further comprising:
in one of the first and second modes of operation, the first and second multi-stage charge pump circuits are coupled at the ends thereof in series.

16. The circuit as recited in claim 15 further comprising:
in the other of the first and second modes of operation, the first and second multi-stage charge pump circuits operate independently, one generating a positive voltage and the other generating a negative voltage.

17. The circuit as recited in claim 15 further comprising:
in the other of the first and second modes of operation, the first and second multi-stage charge pump circuits operate independently, both generating either positive voltages having different magnitudes or negative voltages having different magnitudes.

18. The circuit as recited in claim 1 further comprising:
a memory array having support circuitry responsive to the charge pump circuit output voltages;
wherein the first mode of operation comprises a first memory array mode of operation; and
wherein the second mode of operation comprises a second memory array mode of operation.

19. The circuit as recited in claim 18 wherein:
the first and second memory array modes of operation respectively comprise first and second write modes of operation.

20. The circuit as recited in claim 19 further comprising:
the first memory array mode comprises a set operation; and
the second memory array mode comprises a reset operation.

21. The circuit as recited in claim 20 wherein said memory array comprises passive element memory cells.

22. The circuit as recited in claim 1 wherein:
in the first mode of operation, the first and second multi-stage charge pump circuits cooperate to generate a single output voltage; and
in the second mode of operation, the first and second multi-stage charge pump circuits operate independently, one generating a positive output voltage and the other generating a negative output voltage.

23. The circuit as recited in claim 22 further comprising:
a memory array having word lines and bit lines, and having support circuitry for said word lines and bit lines responsive to the charge pump circuit;
wherein, in the first mode of operation, the single output voltage is coupled to certain ones of the word lines and bit lines; and
wherein, in the second mode of operation, one of the positive output voltage and negative output voltage is coupled to certain ones of the word lines, and the other of the positive output voltage and negative output voltage is coupled to certain ones of the bit lines.

24. The circuit as recited in claim 23 wherein said memory array comprises passive element memory cells.

25. A circuit comprising:
first and second voltage nodes;
first and second output nodes;
a first multi-stage charge pump circuit comprising a plurality of series-connected directional pump stages, each respective stage configured to transfer charge from a respective input thereof to a respective output thereof
a first switch circuit coupling one end of said first multi-stage charge pump circuit at times to the first voltage node and at other times to the first output node;
a second switch circuit coupling the other end of said multi-stage charge pump circuit at times to the second voltage node and at other times to the second output node;
a second multi-stage charge pump circuit comprising a plurality of series-connected directional pump stages, each respective stage configured to transfer charge from a respective input thereof to a respective output thereof; and
a switch circuit coupling one end of said second multi-stage charge pump circuit at times to one end of the first multi-stage charge pump circuit.

26. The circuit as recited in claim 25 further comprising:
a third voltage node;
a third output node;
a third switch circuit coupling one end of said second multi-stage charge pump circuit at times to the third voltage node and at other times to the third output node; and
a fourth switch circuit coupling the other end of said second multi-stage charge pump circuit at times to one of the first and second voltage nodes and at other times to one of the first and second output nodes.

27. The circuit as recited in claim 25 further comprising:
a memory array having support circuitry responsive to the charge pump circuit output voltages;
wherein a first configuration of the aforementioned switch circuits is established during a first memory array mode of operation; and
wherein a second configuration of the aforementioned switch circuits is established during a second memory array mode of operation.

28. The circuit as recited in claim 25 wherein:
at times, the first and second multi-stage charge pump circuits cooperate to generate a single output voltage; and
at other times, the first and second multi-stage charge pump circuits operate independently to generate separate output voltages.

29. The circuit as recited in claim 28 wherein:
the single output voltage generated at times, and the separate output voltages generated at other times, are all the same polarity.

30. The circuit as recited in claim 28 wherein:
at said other times, one of the first and second multi-stage charge pump circuits generates a positive output voltage, and the other of the first and second multi-stage charge pump circuits generates a negative output voltage.

31. The circuit as recited in claim 30 further comprising:
a memory array having word lines and bit lines, and having support circuitry for said word lines and bit lines responsive to the charge pump circuit;
wherein, in a first mode of operation, the single output voltage is coupled to certain ones of the word lines and bit lines; and
wherein, in a second mode of operation, one of the positive output voltage and negative output voltage is coupled to certain ones of the word lines, and the other of the positive output voltage and negative output voltage is coupled to certain ones of the bit lines.

32. The circuit as recited in claim 31 wherein said memory array comprises passive element memory cells.

33. The circuit as recited in claim 31 wherein:
the first and second multi-stage charge pump circuits are fabricated using a triple well semiconductor technology to allow at times positive voltages and at other times negative voltages on circuit nodes within the plurality of pump stages with respect to a bulk substrate potential.

* * * * *